United States Patent [19]

Bernstein et al.

[11] Patent Number: 5,526,499

[45] Date of Patent: Jun. 11, 1996

[54] SPECULATIVE LOAD INSTRUCTION RESCHEDULER FOR A COMPILER WHICH MOVES LOAD INSTRUCTIONS ACROSS BASIC BLOCK BOUNDARIES WHILE AVOIDING PROGRAM EXCEPTIONS

[75] Inventors: David Bernstein, Haifa, Israel; Martin E. Hopkins, Chappaqua, N.Y.; Michael Rodeh, Oshrat, Israel

[73] Assignee: International Business Machines Corporation, Armonk, N.Y.

[21] Appl. No.: 364,833

[22] Filed: Dec. 27, 1994

Related U.S. Application Data

[63] Continuation of Ser. No. 882,739, May 14, 1992, abandoned.

[30] Foreign Application Priority Data

May 23, 1991 [IL] Israel ......................................... 098248

[51] Int. Cl.$^6$ ..................................................... G06F 9/45
[52] U.S. Cl. ..................... 395/375; 395/700; 364/DIG. 1
[58] Field of Search ..................................... 395/375, 700, 395/775, 733

[56] References Cited

U.S. PATENT DOCUMENTS

| | | | |
|---|---|---|---|
| 4,435,753 | 3/1984 | Rizzi | 395/700 |
| 4,656,582 | 4/1987 | Chaitin et al. | 395/700 |
| 5,093,916 | 3/1992 | Karp et al. | 395/700 |
| 5,119,495 | 6/1992 | King | 395/700 |
| 5,133,077 | 7/1992 | Karne et al. | 395/800 |
| 5,202,975 | 4/1993 | Rasbold et al. | 395/500 |
| 5,202,995 | 4/1993 | O'Brien | 395/700 |
| 5,303,357 | 4/1994 | Inoue et al. | 395/375 |

OTHER PUBLICATIONS

"Boosting Beyond Static Scheduling in a Superscalar Processor" Smith et al, IEEE 1990, pp. 344-354.
"The Metaflow Architecture", Popescu et al, IEEE 1991, pp. 10-73.
"Organization of the Motorola 88110 Superscalar RISC Microprocessor" Diefendorff et al, IEEE 1992, pp. 40-63.
"A VLIW Architecture for a Trace Scheduling Compiler", Colwell et al, IEEE, vol. 37, No. 8, Aug. 1988, pp. 967-979.

*Primary Examiner*—Parshotam S. Lall
*Assistant Examiner*—Viet Vu
*Attorney, Agent, or Firm*—Ronald L. Drumheller

[57] ABSTRACT

An instruction scheduler for a computer, capable of speculatively scheduling load instructions by moving certain categories of load instructions in an input instruction sequence from a source block of instructions to a target block of instructions to form an output instruction sequence, the instruction scheduler comprising: logic for selecting a data-independent load instruction as a candidate for rescheduling; logic for determining whether the base register that the load instruction makes use of and/or the contents thereof meets any one of a number of conditions; logic for moving the selected load instruction from the source block to the target block in response to determination that any one of the conditions is met.

10 Claims, 1 Drawing Sheet

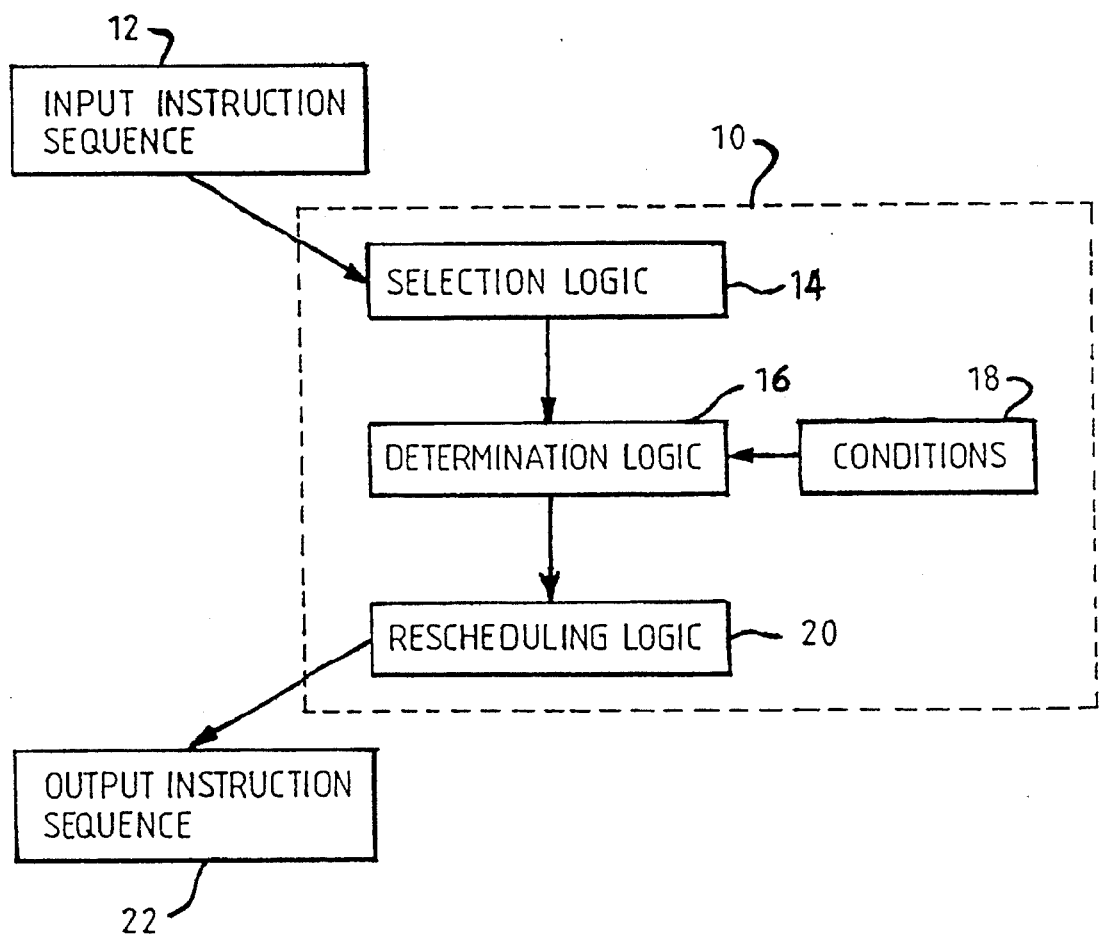

SPECULATIVE LOAD INSTRUCTION RESCHEDULER FOR A COMPILER WHICH MOVES LOAD INSTRUCTIONS ACROSS BASIC BLOCK BOUNDARIES WHILE AVOIDING PROGRAM EXCEPTIONS

This is a continuation of application Ser. No. 07/882,739, filed May 14, 1992, now abandoned.

FIELD OF THE INVENTION

The present invention relates to an instruction scheduler for a computer and in particular to an instruction scheduler capable of speculatively scheduling certain categories of load instructions in a manner suitable for use with a parallel/pipelined computer.

References

1. D. A. Patterson, D. A., "Reduced Instruction Set Computers", Communications of the ACM, (January 1985), pp. 8–21.
2. J. J. Hennessy et al., "Postpass Code Optimisation of Pipeline Constraints", ACM Transactions on Programming Languages and Systems 5, (July 1983), pp. 422–448.
3. P. B. Gibbons et al., "Efficient Instruction Scheduling for a Pipelined Architecture", Proceedings of the ACM Symposium on Compiler Construction, (June 1986).
4. H. Warren, "Instruction Scheduling for the IBM Risc System/6000 Processor", IBM Journal of Research and Development, Vol. 34, No. 1, January 1990, pp 85–92.
5. R. D. Groves et al., "An IBM Second Generation RISC Processor Architecture", Proceedings of the IEEE Conference on Computer Design, (October 1989), pp. 134–137.
6. N. P. Jouppi et al., "Available Instruction-Level Parallelism for Superscalar and Superpipelined Machines", Proceedings of the 3rd ASPLOS Conference, (April 1989), pp. 272–282.
7. M. C. Golumbic et al., "Instruction Scheduling Beyond Basic Blocks", IBM Journal of Research and Development, Vol. 34, No. 1, January 1990, pp 93–97.
8. D. Bernstein et al., Israeli Patent Application No. 95996, (1990).
9. K. Ebcioglu et al., "A New Compilation Technique for Parallelising Loops with Unpredictable Branches on an VLIW Architecture", Proceedings of the Workshop on Languages and Compilers for Parallel Computing, (August 1989), Urbana.

BACKGROUND OF THE INVENTION

Instruction scheduling is a process of rearranging or transforming program statements before execution by a processor in order to reduce possible run-time delays between compiled instructions. Instruction scheduling is usually performed at an intermediate language or assembly code level. Such transformations must preserve data dependences and are subject to other constraints. This can be particularly advantageous when compiling for pipelined machine architectures, which allow increased throughput by overlapping instruction execution. For example, if there is a delay of one cycle between fetching and using a value V, it would be desirable to "cover" this delay with an instruction that is independent of V and is "ready" to be executed.

A particular application for instruction scheduling is in the field of so-called Reduced Instruction Set Computers (RISC). An introduction to RISC computers can be found in Reference 1.

The RISC approach to building high speed processors, which emerged in the late seventies, emphasises the need for the streamlining of program instructions. As a result, instructions have to be rearranged, usually at the intermediate language or assembly code level, to take full advantage of pipelining and thereby to improve performance. The burden of the instruction scheduling, is placed on optimising compilers that generate code for RISC processors. Usually, the compilers perform instruction scheduling at the basic block level, solving most of the problems posed by the pipelined structure of RISC processors.

Approaches to scheduling at the instruction level for pipelined machines are described in a number of articles (see References 2, 3, and 4).

Whereas for machines with n functional units the idea is to be able to execute as many as n instructions each cycle, for pipelined machines the goal is to issue a new instruction every cycle, effectively eliminating the so-called NOPs (No OPerations). However, for both types of machines, the common feature required from the compiler is to discover in the code instructions that are data independent, allowing the generation of code that better utilises the machine resources.

It was a common view that such data independent instructions can be found within basic blocks, and that there is no need to move instructions beyond basic block boundaries. A basic block is a sequence of consecutive instructions for which the flow of control enters at the beginning of the sequence and exits at the end thereof without a wait or branch possibility, except at the point of exit. Virtually, all of the previous work on the implementation of instruction scheduling concentrated on scheduling within basic blocks (see References 2, 3 and 4 above).

Even for basic RISC architectures, however, such a restricted type of scheduling may result in code with many NOPs for a large family of programs including many UNIX-type (UNIX is a trademark of UNIX System Laboratories Inc.) programs that include many small basic blocks terminated in unpredictable branches. For scientific programs, where basic blocks tend to be larger, these problems tend not to be so severe.

Recently, a new type of architecture is evolving that extends RISC by the ability to issue more than one instruction per cycle, (see Reference 5).

This type of high speed processor organisation, called superscalar or superpipelined architecture, poses more serious challenges to compilers, since instruction scheduling at the basic block level is not sufficient to allow generation of code that utilises machine resources to a desired extent (see Reference 6).

One recent effort to pursue instruction scheduling for superscalar machines was reported in Reference 7. In this article, code replication techniques for scheduling beyond the scope of basic blocks were investigated, resulting in considerable improvements of running time of the compiled code. Recently different approaches for moving instructions beyond basic block boundaries have been presented (see References 8 and 9). However, the effect of moving instructions beyond block boundaries is limited unless the instructions can be scheduled speculatively. Speculative scheduling means that instructions are executed ahead of time before a preceding conditional branch is performed. Therefore sometimes the results of such speculatively scheduled instructions are not used in the subsequent execution of the program.

An important class of speculative instructions is speculative load instructions. This is because usually a computational sequence starts with loading operands from the memory into registers. However, if load instructions are scheduled speculatively an undesired exception may be caused in program execution, due to an access to a non-existent or protected memory location.

The object of the present invention is to provide for speculative scheduling of load instructions without such program exceptions being caused.

Therefore, according to a first aspect of the present invention there is provided an instruction scheduler for rescheduling an input instruction sequence to form an output instruction sequence to run on a computer, the instruction scheduler being capable of speculatively scheduling load instructions by moving certain categories of load instructions from a source block of instructions in the input instruction sequence to a target block of instructions to form the output instruction sequence, the instruction scheduler comprising:

logic for selecting a data-independent load instruction as a candidate for rescheduling;

logic for determining whether the base register that the load instruction makes use of and/or the contents thereof meets any one of a number of conditions;

logic for moving the selected load instruction from the source block to the target block in response to determination that any one of the conditions is met.

The safeness of rescheduling a candidate load instruction can be determined by classifying load instructions into a number of categories based on whether the base register the instruction makes use of and/or its contents satisfy any one of a number of conditions.

One of the conditions can be that the base register contains a pointer to a memory area where addresses of global variables are stored. In general, it can be assumed that speculative rescheduling of load instructions whose base register contains a pointer to a memory area where addresses of global variables are stored will not cause a program exception.

Another of the conditions can be that both the base register of the selected load instruction be the same register as is being used as the base register of another load instruction within the target block and that there does not exist any instruction that changes the contents of this register in the path between the target block and the source block. In this case the instruction scheduler must further comprise means for allocating an extra dummy page, which can be defined in read only mode, in front of and after each data segment of a program. It can be assumed that if executing a similar, but non-speculative, load in the target block does not give rise to a program exception, then executing the speculative load instruction will not give rise to one either, provided that the contents of the register is not changed in program execution between the target block and the source block. The extra dummy page is required to avoid the possibility that a speculative load has a larger displacement than its non-speculative counterpart and thus may cross data-segment boundaries and enter into a non-existent or protected region. Advantageously, these extra pages can be defined in read-only mode, so no program exception will be caused by executing a load from the memory locations belonging to them.

A third condition can be that both the contents of the base register of the load instruction equals zero and that the contents of the base register not be changed in the path between the target block and the source block. In this case page zero can be defined, by the operating system of the computer on which the rescheduled code is to run, in read only mode, and a finite number of bytes of page zero, for example the first 64, can be filled with zeros.

The invention further enables a compiler to be provided for compiling code to run on a computer, the compiler including an instruction scheduler in accordance with the invention. Also a computer in provided including such an instruction scheduler. In an advantageous form of the invention the computer has a superscalar and/or superpipelined architecture.

Viewed from another aspect the invention provides a method of rescheduling an input program instruction sequence, the input instruction sequence being partitioned into blocks of instructions, the method comprising: (a) selecting a data-independent load instruction from a source block of instructions as a candidate instruction; (b) determining whether the base register the load instruction makes use of or the contents thereof satisfies any one of a number of conditions; and if so, (c) rescheduling the input program instruction sequence so that the candidate instruction is moved to a target block of instructions.

An embodiment of the invention will be described in the following, with reference to the accompanying tables, to be found at the end of the description, and the drawing which shows a schematic overview of an instruction scheduler in accordance with the invention.

In this embodiment of the invention, the instruction scheduler forms part of a compiler, specifically one of the IBM XL family of compilers for the IBM RISC System/6000 computers (IBM and RISC System/6000 are trademarks of International Business Machines Corporation).

The drawing shows a schematic overview of an instruction scheduler 10 in accordance with the invention. The instruction scheduler takes an input instruction sequence 12 as its input. Selection logic 14 selects a data-independent load instruction as a candidate instruction for speculative rescheduling from a source block of instructions to a target block of instructions. Determination logic 16 determines whether the load instruction falls into one of three categories by examining the base register which the load instruction uses and its contents and ascertaining whether any one of three conditions 18 defining the categories is satisfied. If the load instruction falls into one of the three categories then rescheduling logic 20 moves the instruction from the source block of instructions to the target block of instructions to form the output instruction sequence 22.

The nature of the categories and how the conditions arise, which a load instruction must satisfy to be included in one of the categories, will be discussed in detail below. First, however, a brief example will be given to demonstrate the concept of speculative loads.

Table I shows an excerpt from the IBM RISC System/6000 pseudo-code produced by the compiler for the inner loop of the XLYGETVALUE function taken from the SPEC LI benchmark. In all code examples herein we assume that the patterns of the code are similar to those produced by the IBM XL compiler for the processor of the IBM RISC System/6000 machine discussed in R5. The SPEC benchmark suite has recently been accepted as a standard to measure the performance of workstation systems. The Lisp Interpreter (LI) is one of the benchmark programs that is written in the programming language C.

In the examples, SHADOW4$ means a memory access through a pointer. The address of the memory location accessed by a load is computed by the sum of the contents of its base register and its displacement. For example, L r5=SHADOW4$ (R5,8) accesses the memory location at the address contents (r5)+8.

The following structure is assumed for the time delays incurred in the processor pipeline:

1. there is a one cycle delay between a load instruction and a subsequent use of the operand loaded by it;
2. there is a three cycle delay between a compare instruction and a subsequent branch on the condition that was set by the compare. In fact, in the IBM RISC System/ 6000 processor there is often no delay between a compare and a matching conditional branch, when this branch is not taken. However, for simplicity, it is assumed here that the delay is always incurred.

Under such assumptions the loop presented in the example shown in Table I executes 14 cycles per iteration. The performance of this loop cannot be improved by rearranging the instructions within each of the two basic blocks.

However, if instructions are moved speculatively from the second block (B2) to the first (B1), we get the code shown in Table II, which executes 8 cycles per iteration, and which constitutes an improved version of the code shown in Table I.

The load instruction L r5=SHADOW4$ (r5,8) has now been scheduled speculatively, since without moving that instruction, no instruction can be moved at all. However a question that needs to be addressed is: can that load instruction cause a program exception under any circumstances?

In this particular example we notice that there was another non-speculative load L r4=SHADOW4$ (r5,4) which uses the same base register with a slightly different displacement. It may be assumed that these two loads reference different fields of the same record. Therefore, with a high degree of confidence it may be assumed that this speculative load will never cause all exception. In the following it will be shown how this observation may be used to provide a software environment with full confidence that no exception will occur.

Let us assume that we would like to move a load instruction from a source block, such as B2, to a target block, B1. Our purpose is to determine if it is safe to move the load from B2 to B1.

The address of the memory location accessed by a load is computed by the sum of the contents of its base register and its displacement. For example, L r5=SHADOW4$ (R5,8) accesses the memory location at the address contents (r5)+8. Then, the question of safeness may be rephrased as follows: Is it legal to access the referenced memory location when the instruction is located in the target block rather than in the source block?

Three categories of safe speculative loads, i.e. speculative loads that will never cause exceptions, may be distinguished according to the base register that a load instruction makes use of and/or its contents.

The three categories are:

1. Global Loads, i.e. loads for global scalar variables;
2. Similar Loads, i.e. loads that are "similar" to a load in the target block;
3. NIL Pointer Loads, i.e. load instructions whose base register contents equals '0'.

We will discuss these categories of safe speculative loads in turn.

1. Global Loads

In the environment of the XL compiler the addresses of the global scalar variables are computed in load time and are stored in a Table of Contents (TOC). A special register is assigned to keep a pointer to the TOC, therefor it is safe to fetch data from such addresses in the TOC and to access them with the load instruction placed in the target block instead of in the source block.

To identify the global loads, we scan the load instruction and look for its base register and if it is the special register containing the TOC pointer, the load instruction is assumed safe, and is allowed to be scheduled speculatively.

2. Similar Loads

The idea of identifying similar loads is that we look for another load in the target block which uses the same base register and a close displacement. For example, in the example shown in Table I the load L r5=SHADOW4$ (r5,8) is similar to L r4=SHADOW4$ (r5,4). Also, we make sure that the base register of the speculative load was not redefined on the path from the target block to the source block. By the latter we mean that no other instruction assigns a value to the register in the path between the blocks, i.e. that the value of the register that was in effect in the source block is still valid in the target block.

In this case, we assume that if it was legal to execute a similar, but non-speculative, load in the target block, then executing the speculative load must be legal as well. This assumption requires a certain support to be provided in the link editor since it is possible that, by having a larger displacement than its non-speculative counterpart, a speculative similar load will cross the data segment boundaries, entering into a protected or non-existent region. The solution to this problem is to allocate in the link editor an extra dummy page in front and after each data segment of the program. These extra pages are defined in read only mode, so no exception can be caused by executing a load from the memory locations belonging to them.

The purpose of the support required in the operating system is that there must be a guarantee that forbidden memory areas are not entered when executing the scheduled instruction.

3. NIL pointer loads

Consider a rearranged version of the code used in the previous example and shown in Table III.

Table III shows three basic blocks, B1, B2 and B3, in a loop, and all the computational instructions are in B3. Let us assume that we would like to move load instructions from B3 to B2. None of the loads have a similar counterpart in B2, so they do not fall into the category of similar loads, and they are not global loads either.

However, the first two loads of B3 use r5 as a base register. Also notice that r5 was compared to zero in C cr0=r5,0, and that BT OUT1 ,cr0,0x4/eq is using the result of that compare. So, if r5 is not zero we are executing B3, and all the loads are performed as needed. When r5 is equal to zero, the program is supposed to leave the loop, without executing any of the loads of B3.

If page zero is defined in read-only mode then such NIL pointer loads can access page zero without causing program exceptions. So the first two loads can be moved from B3 to B2 without causing program exceptions, as shown in the code of Table IV.

The algorithm for identifying NIL pointers loads can be expressed as follows:

1. find the base register of the considered speculative load,
2. make sure that the base register was not redefined in the path from the source block to the target block (again as with similar loads, by the latter we mean that no other instruction assigns a value to the register in the path between the blocks, i.e. the value of the register that was in effect in the source block is still valid in the target block), 3. find the conditional register which is used in the branch of the target block,
4. find the compare instruction that sets this condition register,
5. check if the compare instruction compares the base register to zero, and if it does, move the instruction safely to the target block.

To support NIL pointer loads, first page zero is defined in read only mode, effectively allowing the NIL pointer loads to access it without causing exceptions.

Now, the third load of B3, L r0=SHADOW4$ (r4,4), does not fall into either of the categories of the safe speculative loads we describe here. However, if we assume that the value loaded by L r4=SHADOW4$ (r5,4) is zero, then the third load in its turn becomes a NIL pointer load, and as such is allowed to move to B2. This requires the first, say 64, bytes of page zero to be filled with zeros, thus allowing additional speculative loads to belong to the category of NIL pointer loads.

In Table V some statistics are shown for the frequency of occurrence for the three categories of speculative loads. XLSYM, XLEVAL and XLDMEM are three source files from the SPEC LI benchmark. Each of them contains 20 to 30 relatively small C functions. In column TOTAL we show the total number of loads that were considered for speculative execution, while columns GLOB, SIM and NIL include the number of such loads that were identified for the class of global, similar and NIL pointer loads, respectively. It can be seen that the major fraction of speculative loads (70%–90%) fall into one of the three categories and therefore can safely be speculatively scheduled.

Thus, the present invention allows an instruction scheduler to be provided wherein the safeness of speculative loads is determined by ensuring that a candidate load instruction for rescheduling falls into one of the three categories. Experiments using sample code show that a major fraction of load instructions are eligible for speculative execution on this basis, when a certain support in the operating system is available. This saves the silicon space and the design time required to support the speculative loads in the machine architecture and preserves the object code compatibility with existing machines.

TABLE I

```
LOOP:
    L      r4=SHADOW4$(r5,4)   ⎤
    L      r0=SHADOW4$(r4,4)   ⎥  B1
    CL     cr1=r3,r0           ⎥
    BT     OUT, cr1, 0x4/eq    ⎦
    L      r5=SHADOW4$(r5,8)   ⎤
    C      cr0=r5,0            ⎥  B2
    BF     LOOP,cr0,0x4/eq     ⎦
    return(not found)
OUT: return(found)
```

TABLE II

```
LOOP:
    L      r4=SHADOW4$(r5,4)
    L      r5=SHADOW4$(r5,8)
    L      r0=SHADOW4$(r4,4)
    C      cr0=r5,0
    CL     cr1=r3,r0
    BT     OUT,cr1,0x4/eq
    BP     LOOP,cr0,0x4/eq
    return(not found)
OUT: return(found)
```

TABLE III

```
    L      r4=SHADOW4$(r5,4)
    L      r5=SHADOW4$(r5,8)
    L      r0=SHADOW4$(r4,4)
    C      cr0=r5,0
    CL     cr1=r3,r0
LOOP:
    BT     OUT,cr1,0x4/eq            ---- B1
    BT     OUT1,cr0,0x4/eq           ---- B2
    L      r4=SHADOW4$(r5,4)    ⎤
    L      r5=SHADOW4$(r5,8)    ⎥
    L      r0=SHADOW4$(r4,4)    ⎥
    C      cr0=r5,0             ⎥ --- B3
    CL     cr1=r3,r0            ⎥
    B      LOOP                 ⎦
OUT1: return(not found)
OUT: return(found)
```

TABLE IV

```
    L      r4=SHADOW4$(r5,4)
    L      r5=SHADOW4$(r5,8)
    L      r0=SHADOW4$(r4,4)
    C      cr0=r5,0
    CL     cr1=r3,r0
LOOP:
    BT     OUT,cr1,0x4/eq
    L      r4=SHADOW4$(r5,4)
    L      r5=SHADOW4$(r5,8)
    BT     OUT1,cr0,0x4/eq
    L      r0=SHADOW4$(r4,4)
    C      cr0=r5,0
    CL     cr1=r3,r0
    B      LOOP
OUT1: return(not found)
OUT: return(found)
```

TABLE V

| FILE | GLOB | SIM | NIL | TOTAL |
|---|---|---|---|---|
| XLSYM | 7 | 14 | 15 | 43 |
| XLEVAL | 28 | 14 | 13 | 63 |
| XLDMEM | 9 | 13 | 1 | 34 |

We claim:

1. An instruction scheduler for rescheduling an input instruction sequence to form an output instruction sequence to run on a computer, the instruction scheduler speculatively scheduling load instructions by moving certain categories of load instructions from a source block of instructions in the input instruction sequence to a target block of instructions to form the output instruction sequence, a speculatively scheduled load instruction being a load instruction which has been moved from a position in the input instruction sequence that is later than a conditional branch instruction to a position in the output instruction sequence which is earlier than said conditional branch instruction, each of the load instructions making use of a base register having contents for determining a source address from which to load, the instruction scheduler comprising:

logic for selecting a data-independent load instruction as a candidate load instruction for speculative rescheduling to a target block;

logic for determining whether the base register that the candidate load instruction makes use of and/or the contents thereof meets any one of a number of conditions, each of which assure that speculative movement of the candidate load instruction to the target block will not cause a program exception if the candidate load instruction is executed in the target block; and logic for speculatively moving the candidate load instruction from the source block to the target block in response to determination that any one of the conditions is met.

2. An instruction scheduler as claimed in claim 1 wherein one of the conditions is that the base register contains a pointer to a memory area where addresses of global variables are stored.

3. An instruction scheduler as claimed in claim 1 wherein one of the conditions is that both
   (a) the base register of the candidate load instruction be the same register as is being used as the base register of another load instruction within the target block and
   (b) there does not exist any instruction that changes the contents of this register in the path between the target block and the source block, the instruction scheduler further including means for allocating an extra dummy page, defined in read only mode, in front of and after each data segment of a program.

4. An instruction scheduler as claimed in claim 1 for forming an output instruction sequence to run on a computer having an operating system wherein page zero is defined in read only mode, and a finite number of bytes of page zero are filled with zeros, one of the conditions being that both
   (a) the contents of the base register of the candidate load instruction equals zero and
   (b) the contents of the base register not be changed in the path between the target block of instructions and the source block of instructions.

5. An instruction scheduler as claimed in claim 4 wherein the finite number of bytes of page zero are the first 64 bytes of page zero.

6. A compiler for compiling code to run on a computer, the compiler including an instruction scheduler as claimed in claim 1.

7. A computer including an instruction scheduler as claimed in claim 1.

8. A computer as claimed in claim 7 having a superscalar and/or superpipelined architecture.

9. A method of rescheduling an input program instruction sequence, wherein said rescheduling allows load instructions to be speculatively scheduled, a speculatively scheduled load instruction being a load instruction which has been moved from a position in the input program instruction sequence that is later than a conditional branch instruction to a position in an output instruction sequence which is earlier than said conditional branch instruction, the input instruction sequence being partitioned into blocks of instructions and containing load instructions, each of the load instructions making use of a base register having contents for determining a source address from which to load, the method comprising:
   a. selecting a data-independent load instruction from a source block of instructions as a candidate load instruction for speculative movement to a target block of instructions;
   b. determining whether the base register the candidate load instruction makes use of or the contents thereof satisfies any one of a number of conditions, each of which assures that speculative movement of the candidate load instruction to the target block cannot cause a program exception if the candidate load instruction is executed in the target block; and if so,
   c. speculatively rescheduling the input program instruction sequence by moving the candidate load instruction to the target block of instructions.

10. A method, as claimed in claim 9, wherein the determining step (b) comprises the substeps of:
   (b1) identifying the base register of the candidate load instruction;
   (b2) determining whether or not the base register is redefined in the path from the source block to the target block, and if so the condition being deemed not to be satisfied;
   (b3) identifying the conditional register which is used in the branch of the target block;
   (b4) identifying the compare instruction that sets the condition register;
   (b5) determining whether or not the compare instruction compares the base register to zero, and if it does, the condition being deemed to be satisfied.

* * * * *